United States Patent [19]

Otaka et al.

[11] Patent Number: 5,323,232
[45] Date of Patent: Jun. 21, 1994

[54] FILTER DEVICE FOR DECIMATION AND INTERPOLATION OF CHROMINANCE COMPONENTS OF A VIDEO SIGNAL

[75] Inventors: Hideki Otaka, Neyagawa; Masakazu Nishino, Kashiwara; Tatsurou Juri, Osaka; Shinya Kadono, Katano, all of Japan

[73] Assignee: Matsushita Electric Industrial Co., Ltd., Osaka, Japan

[21] Appl. No.: 738,140

[22] Filed: Jul. 30, 1991

[51] Int. Cl.$^5$ .............................. H04N 11/04
[52] U.S. Cl. ..................... 348/472; 348/571
[58] Field of Search ............. 358/13, 37, 138

[56] References Cited

U.S. PATENT DOCUMENTS

| | | | |
|---|---|---|---|
| 4,396,937 | 8/1983 | Reitmeier et al. | 358/13 |
| 4,672,424 | 6/1987 | Lechner | 358/14 |
| 5,032,910 | 7/1991 | Cok | 358/13 |
| 5,047,838 | 9/1991 | Murakami et al. | 358/13 |

FOREIGN PATENT DOCUMENTS 0302500 2/1989 European Pat. Off. .
0329976 8/1989 European Pat. Off. .
63-316990 12/1988 Japan .

Primary Examiner—Alvin E. Oberley
Assistant Examiner—Minsun Oh
Attorney, Agent, or Firm—Wenderoth, Lind & Ponack

[57] ABSTRACT

A decimation or interpolation filter is selectively used for decimation or interpolation of pixel data of a chrominance component of a video signal, In general, the chrominance signal and the luminance signal are closely related to each other and their edge pattern data coincide with each other when reproduced on a picture screen. A filter device for decimation or interpolation of the chrominance signal is arranged to perform a number of filtering actions depending on the presence or absence and location of edge pattern data. The present, absence, and location of the edge pattern data is detected using a luminance signal which is neither decimated nor interpolated.

4 Claims, 11 Drawing Sheets

FIG. 3
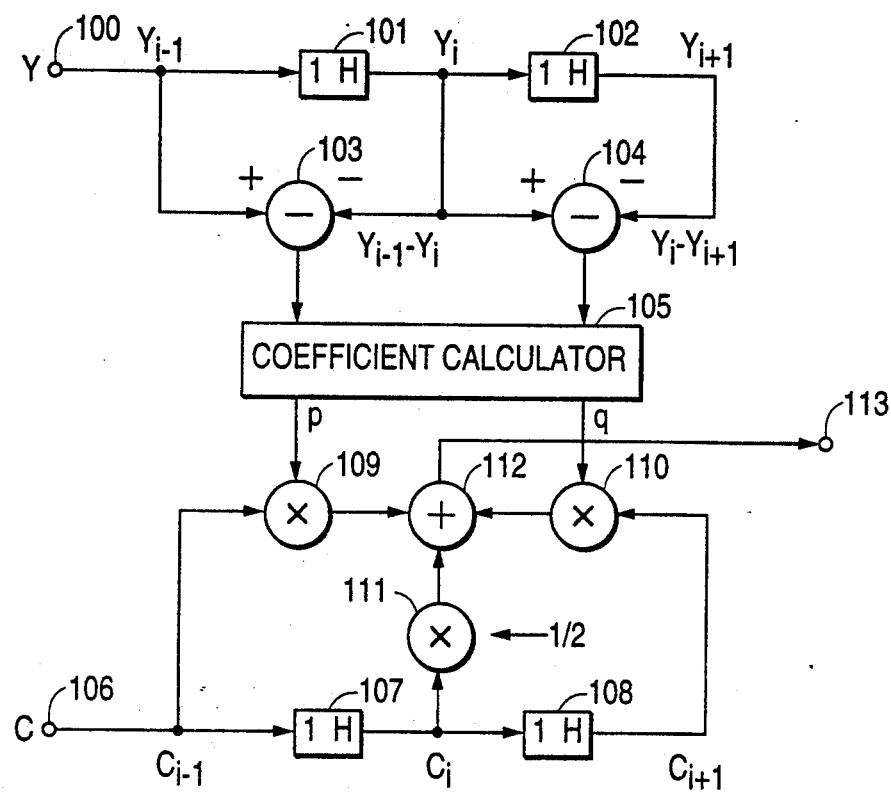
FIG. 5-a
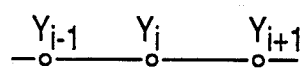
FIG. 5-b
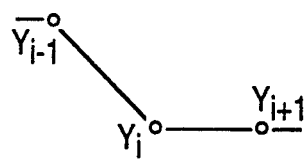
FIG. 5-c
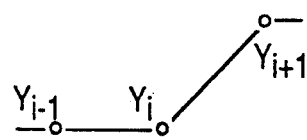

FIG. 7
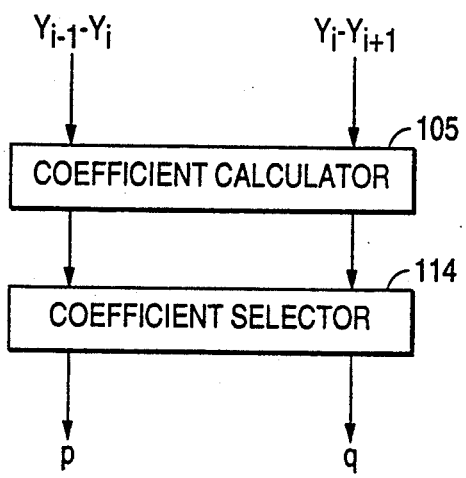
FIG. 4-a
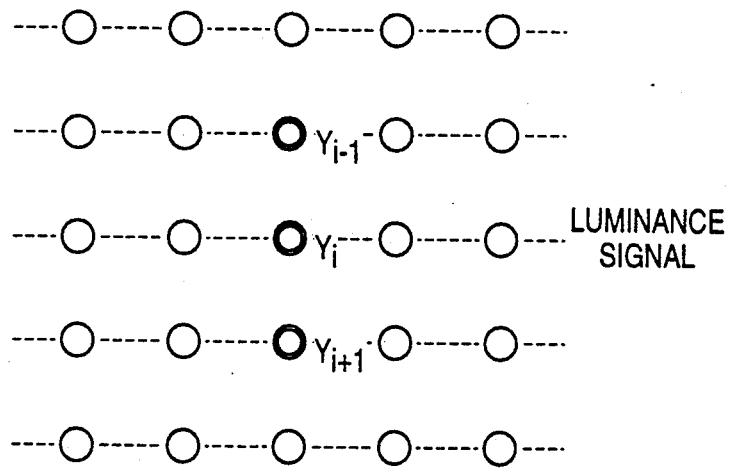
LUMINANCE SIGNAL
FIG. 4-b
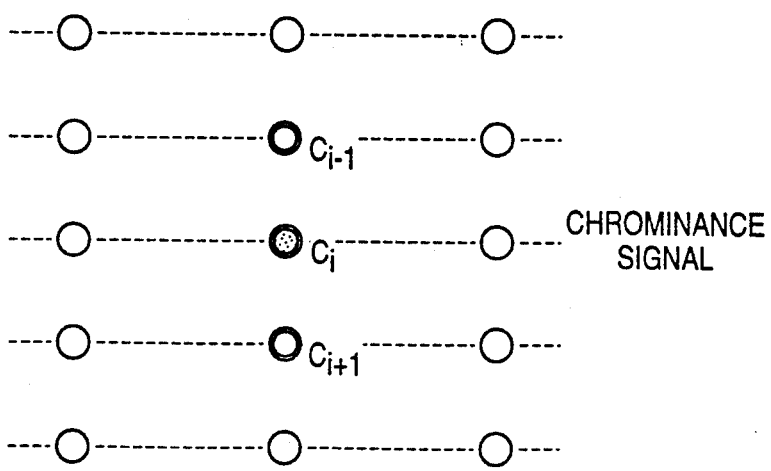
CHROMINANCE SIGNAL

FIG. 13
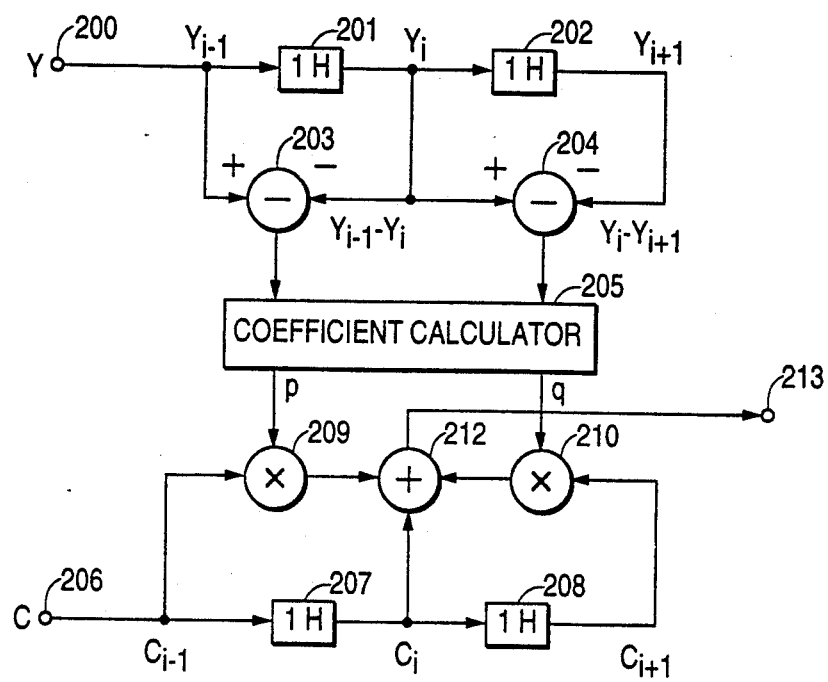
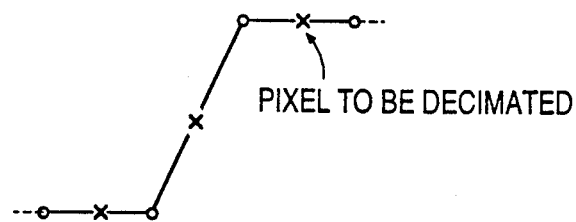
FIG. 6-b
PIXEL TO BE DECIMATED
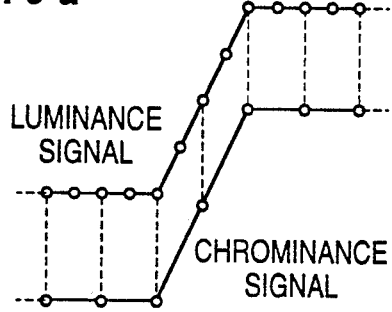
FIG. 6-a
LUMINANCE SIGNAL
CHROMINANCE SIGNAL
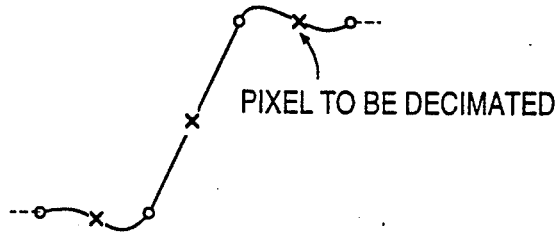
FIG. 6-c
PIXEL TO BE DECIMATED

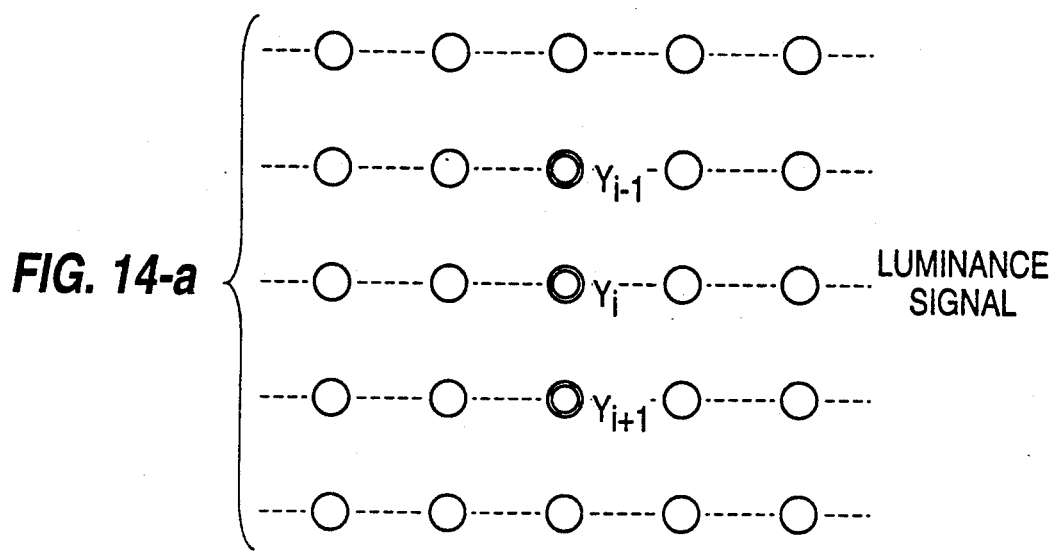
FIG. 14-a LUMINANCE SIGNAL
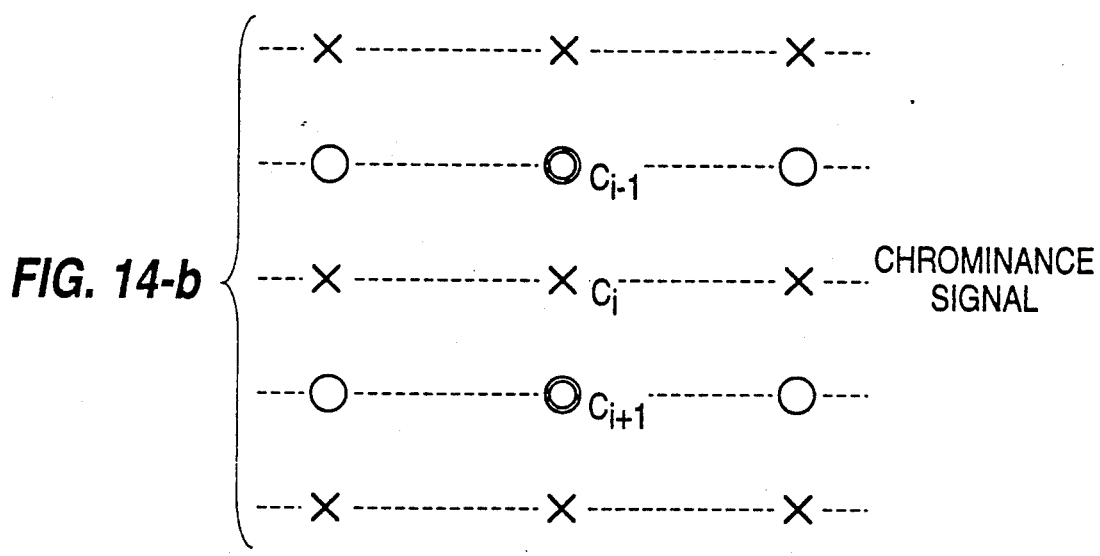
FIG. 14-b CHROMINANCE SIGNAL
FIG. 18
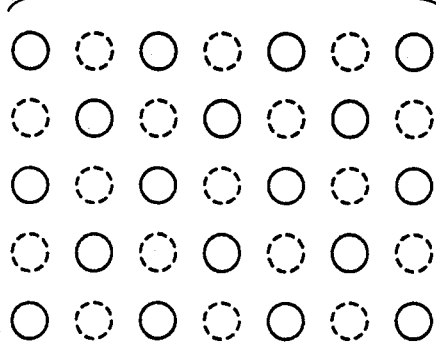

FILTER DEVICE FOR DECIMATION AND INTERPOLATION OF CHROMINANCE COMPONENTS OF A VIDEO SIGNAL

BACKGROUND OF THE INVENTION

1. Field of the Invention

The present invention relates to a chroma signal decimation filter device for removing sampled data from the chrominance component of a digital video signal and a chroma signal interpolation filter device for interpolating the sampled data using their adjacent data.

2. Description the Prior Art

For reducing the data of a video signal to a desired size for ease of recording or transmission, a method of decimation of horizontal or vertical sample data of the signal is commonly employed. While the amount of data of a signal for recording or transmission is decreased its frequency band to be reproduced is less than a particular (or Nyquist) frequency which has a wavelength which is two times the sampling period. If the frequency band before sampling exceeds the Nyquist frequency, aliasing distortion will appear thereby reducing the quality of a reproduced image. The Nyquist theorem suggests that the sampled data dropped by decimation will be restored through filtering them to pass only a Nyquist bandwidth portion.

The aliasing distortion is undesired in visual reproduction and must be eliminated by reducing, prior to data decimation, the bandwidth of a signal to less than the Nyquist frequency with a lowpass filter in a conventional signal decimation device. For interpolation of a data portion below the Nyquist frequency, the same lowpass filter for limiting a bandwidth to less than the Nyquist frequency can be used. More specifically, all the frequency components below the Nyquist frequency can be decoded with the LPF which is thus desirable for use as an interpolation device.

It is known that the visual sensitivity of human eyes is not high to a chrominance signal as compared with a luminance signal and also, high frequency components are less sensitive than low frequency components. Accordingly, the technique of decimating the chrominance components is preferred for reducing the amount of data of a video signal. Such devices for limiting the band of the chrominance components to a suitable width for decimation and interpolation are known as a chroma signal decimation filter device and a chroma signal interpolation filter device.

However, known chroma signal decimation and interpolation filter devices are not capable, never in theory, of reproducing a frequency band more than the Nyquist frequency. For example, an image data which contains an elaborate picture pattern of colors can be processed by the known chroma signal decimation and interpolation filter devices with the development of undesired color fringing.

SUMMARY OF THE INVENTION

It is an object of the present invention to provide a chroma signal decimation filter device and a chroma signal interpolation filter device which both can reproduce a band of frequencies of a video signal more than a level determined by the Nyquist frequency without development of aliasing distortion after the decimation and interpolation of chrominance data.

For achievement of the above object, a chroma signal decimation filter device according to the present invention comprises: a correlation detector for detecting a correlation between pixel data of a luminance signal which correspond in a positional assignment on a picture screen to those of a chrominance signal; a filter unit for performing at least two different filterings using a target pixel data and its adjacent pixel data of the chrominance signal; and a filter selector for determining the filtering procedure of the filter unit in accordance with the correlation between the pixel data of the luminance signal detected by the correlation detector.

Also, a chroma signal interpolation filter device according to the present invention comprises: a correlation detector for detecting a correlation between pixel data of a luminance signal which correspond in the positional assignment on a picture screen to those of a chrominance signal, one of which is a target pixel data to be interpolated and has a value of 0; a filter unit for performing a filtering using some other chrominance pixel data other than the target pixel data to be interpolated; and a filter selector for determining filter coefficients of the filter unit in accordance with the correlation between the pixel data of the luminance signal detected by the correlation detector.

Another chroma signal interpolation filter device according to the present invention is provided comprising: a correlation detector for detecting a correlation between pixel data of a luminance signal which correspond to those of a chrominance signal, one of which is a target pixel data to be interpolated, in the positional assignment on a screen; a filter unit for performing at least two different filterings on the target pixel data to be interpolated using some chrominance pixel data than the target pixel data while not filtering the other pixel data of the chrominance signal; and a filter selector for determining the filtering procedure of the filter unit in accordance with the correlation between the pixel data of the luminance signal detected by the correlation detector.

As understood from the description of the prior art, the aliasing distortion which is unwanted in visual display will appear with the Nyquist thoerem if the filtering for limiting a frequency band in accordance is not carried out during the decimation and interpolation of chrominance data. Also, a conventional hardware arrangement designed for performing the foregoing filtering with the Nyquist theorem is large in the size whereby aliasing distortion will hardly be avoided. In particular, the aliasing distortion tends to appear in the form of color fringing at the edge and outline regions of a reproduced picture and if worse, the filtering itself will cause more error in a particular video signal than the aliasing distortion thus reducing the quality of the picture.

In common, the chrominance component of a video signal is closely related with the luminance component and its edge or outline pattern of picture will appear at the same location on a screen as of the luminance signal. Accordingly, declination in the picture quality during the decimation and interpolation of the chrominance components can be prevented by detecting the location of an edge or outline portion from the luminance components which is neither decimated nor interpolated and filtering the edge or outline pattern data with a filter which provides less color fringing and the remaining data with another filter which provides less aliasing distortion.

In the operation of the chroma signal decimation and interpolation filter devices of the present invention, the correlation detector is actuated for calculating a correlation between pixel data of the luminance component. For example, if the correlation calculated by the correlation detector is low, it is determined that an edge or outline pattern data is carried. Then, the filter selector actuates the filter unit to select a filter which provides less color fringing. Otherwise, a filter which provides less aliasing distortion will be selected. Also, more than two types of filters may be provided for corresponding to the location of an edge pattern and the magnitude of a correlation. With the use of the foregoing improved arrangement, the quality of a reproduced image will be much improved as compared with a conventional arrangement employing a stationary Nyquist filter.

DESCRIPTION OF THE DRAWINGS

FIG. 3 is a block diagram of a chroma signal decimation filter device showing a third embodiment of the present invention;

FIGS. 4-a and 4-b are an explanatory illustration showing the pixel data arrangement of both a chrominance signal and a luminance signal;

FIGS. 5-a, 5-b and 5-c are an explanatory illustration showing variations in the luminance signal;

FIGS. 6-a, 6-b, and 6-c are an explanatory illustration showing a filter output of the chrominance signal which contains an edge pattern data;

FIG. 7 is a block diagram showing an arrangement of a coefficient selector means;

FIG. 13 is a block diagram of a chroma signal interpolation filter device showing a seventh embodiment of the present invention;

FIGS. 14-a and 14-b are an explanatory illustration showing the pixel data arrangement of both a chrominance signal and a luminance signal;

FIG. 18 is an explanatory illustration showing the pixel data arrangement of a chrominance signal;

DESCRIPTION OF THE PREFERRED EMBODIMENTS

Figure 1:
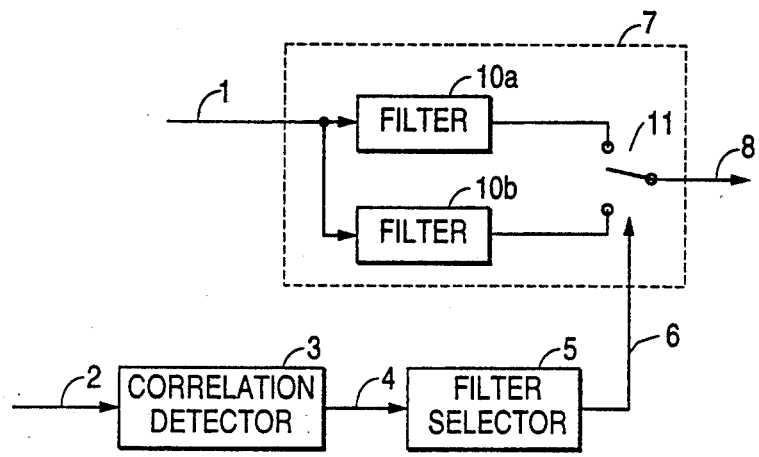
FIG. 1 is a block diagram of a chroma signal decimation filter device showing a first embodiment of the present invention.

FIG. 1 is a block diagram of a chroma signal decimation filter device showing a first embodiment of the present invention. Illustrated in FIG. 1 are an input chrominance signal 1, an input luminance signal 2, a correlation detector 3 for calculating a correlation between two data of the input luminance signal 3, a correlation signal 4, a filter selector 5 for selecting a filter to be used, a filter selecting signal 6 for activating the filter selected by the filter selector 5, and a filter unit 7 for filtering the input chrominance signal 1. The filter unit 7 comprises a pair of filters 10a and 10b for filtering the input chrominance signal 1 and a selector switch 11 for connecting one of the two filters 10a and 10b of which an output is delivered as an output signal 8.

The operation of the chroma signal decimation filter device of the first embodiment having the foregoing arrangement will now be described. The input luminance signal 2 is fed to the correlation detector 3 where a correlation between pixel data is calculated. If the correlation is high, the input luminance signal 2 is relatively flat. If it is low, the image data represents a sharp edge or outline pattern of picture. The chrominance signal is closely related to the luminance signal and if the luminance signal contains a sharp edge or outline image data, there is high probability that similar data of chrominance signal is in the same position on a screen. In operation, the filter selector 5 is hence actuated to select either the filter 10a for improving the quality of a flat pattern or the filter 10b for improving the quality of a sharp edge or outline pattern. More particularly, if the correlation is high, the filter 10a is selected by the action of the selector switch 11 for filtering the input chrominance signal 1 and if low, the filter 10b is selected.

As understood, the filter unit 7 containing the two filters 10a and 10b and the selector switch 11 is controlled by the filter selector 5 for activating appropriate one of the filters 10a and 10b in correspondence to the image data carried in the input signal, thus minimizing a distortion in the picture quality which is inherent in a conventional chroma signal decimation filter device.

Figure 2:
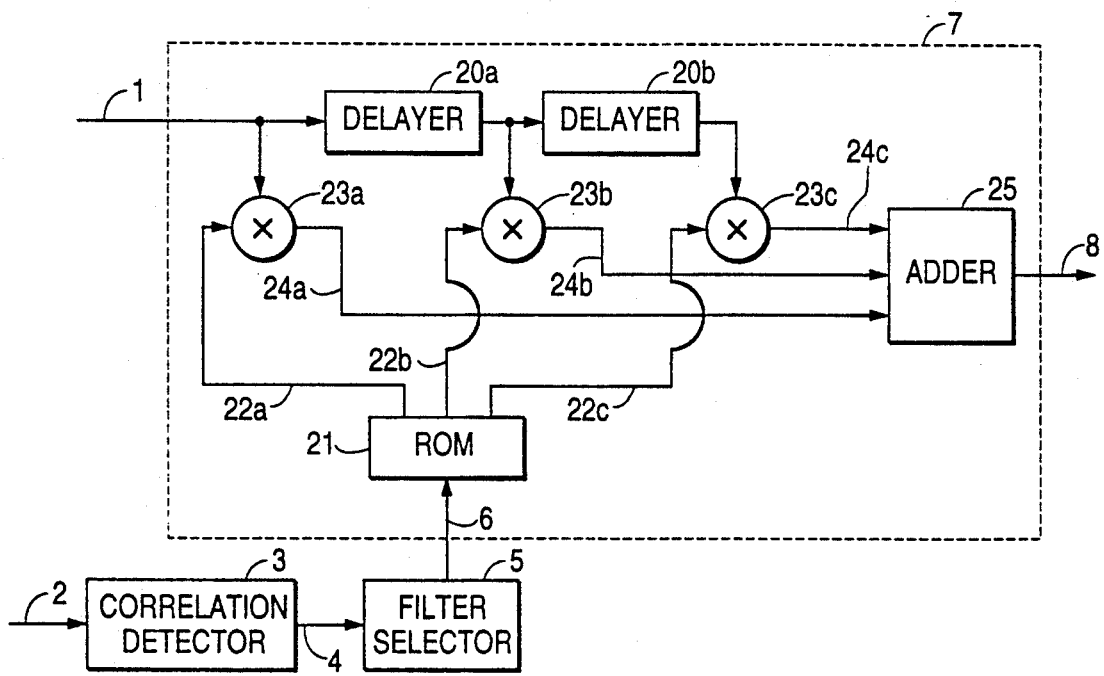
FIG. 2 is a block diagram of a chroma signal decimation filter device showing a second embodiment of the present invention.

FIG. 2 is a block diagram of a chroma signal decimation filter device showing a second embodiment of the present invention, in which a correlation detector 3 and a filter selector 5 are identical in the arrangement to those of the first embodiment shown in FIG. 1 while a filter unit 7 is different The filter unit 7 comprises two delayers 20a and 20b for producing a delay of an input chrominance signal 1, a ROM 21 arranged for delivering three different outputs 22a, 22b, and 22c on receiving an output signal 6 of the filter selector 5, three multipliers 23a, 23b, and 23c for multiplication of the input signal 1 by the output 22a, a delay signal of the delayer 20a by the output 22b, and a delay signal of the delayer 20b by the output 22c respectively, and an adder 25 for summing product signals 24a, 24b, and 24c of their respective multipliers 23a, 23b, and 23c to form a sum signal which is in turn delivered as the filter output 8.

The operation of the chroma signal decimation filter device of the second embodiment having the foregoing arrangement will be explained. The second embodiment is differed from the first embodiment shown in FIG. 1 by the arrangement of the filter unit 7 in which the action of the two filters 10a and 10b and the selector switch 11 is replaced by the arithmetic operation of three different filter coefficients for producing different filter effects. The filter unit 7 shown in FIG. 2 forms a three-tap filter associated with the three filter coefficients 22a, 22b and 22c. The filter coefficients 22a, 22b, and 22c are derived from three discrete address data of the ROM 21 and released upon receipt of the output signal 6 of the filter selector 5. It is understood that the sum of the three filter coefficients 22a, 22b, and 22c is 1 so that the energy of an output chrominance signal which has been filtered becomes equal to that of the input chrominance signal 1. Also, the three filter coefficients 22a, 22b, and 22c of the ROM 21 are predetermined so that if the filter selector 5 detects that the luminance signal carries edge image data, they provides a filtering for improving the quality of an edge pattern and if not, a filtering for improving the quality of a flat pattern. The filter coefficients 22a, 22b, and 22c are multiplied by the input signal 1, the delay signal of the delayer 20a, and the delay signal of the delayer 20b respectively to the product signals 24a, 24b, and 24c. The product signals 24a, 24b, and 24c are then summed up by the adder 25 to the filter output 8.

FIG. 3 is a block diagram of a line decimation filter device, another form of the chroma signal decimation filter device, showing a third embodiment of the present invention. As shown, there are provided an input terminal 100 for receiving a luminance signal, a pair of 1H delayers 101 and 102, two subtracters 103 and 104 for calculating a differential between two line data, a coefficient calculator 105 for calculating two multiplication coefficients p and q from difference signals of the subtracters 103 and 104, an input terminal 106 for receiving a chrominance signal, a pair of 1H delayers 107 and 108, three multipliers 109, 110, and 111, an adder 112 for summing the product signals from their respective multipliers 109, 110, and 111, and an output terminal 113 for delivering a sum signal. The operation of the above arrangement will be explained.

It is assumed that a pixel data of the chrominance signal is denoted by $C_i$ and two, upper and lower, pixel data next to the pixel data $C_i$ situated on the preceding and succeeding lines are represented by $C_{i-1}$ and $C_{i+1}$ respectively. Similarly, a pixel data of the luminance signal at the same location of a screen as of the pixel $C_i$ is denoted by $Y_i$ and its adjacent two pixel data on the preceding and succeeding lines are represented by $Y_{i-1}$ and $Y_{i+1}$ respectively. For filtering the pixel data $C_i$, $C_{i-1}$, and $C_{i+1}$ of the chrominance signal, the luminance signal is first examined about $Y_i$, $Y_{i-1}$, and $Y_{i+1}$ which are located at the same points as shown in FIGS. 4-a and 4-b. More specifically, the filtering of $C_i$ is expressed by:

$$C_i' = pC_{i-1} + 1/2 C_i + qC_{i+1} \quad (1)$$
$$(p + q = 1/2)$$

The coefficients p and q are determined by the two differentials between the current line and its preceding and succeeding lines of the luminance signal as calculated using the following equations (2) and (3), in which a is a constant for preventing the coefficients p and q from being set to extreme values when the two differentials between the lines both are small. Also, $|Y_i - Y_{i+1}|$ represents the absolute value of $Y_1 - Y_{i+1}$.

$$p = \frac{1}{2} \times \frac{|Y_i - Y_{i+1}| + a}{|Y_{i-1} - Y_i| + a + |Y_i - Y_{i+1}| + a} \quad (2)$$

$$q = \frac{1}{2} \times \frac{|Y_{i-1} - Y_i| + a}{|Y_{i-1} - Y_i| + a + |Y_i - Y_{i+1}| + a} \quad (3)$$

As shown in FIG. 3, the luminance signal fed from the input terminal 100 is examined by the subtracters 103 and in which the differentials $Y_{i-1} - Y_i$ and $Y_i - Y_{i+1}$ between the current line and the preceding and succeeding lines are calculated respectively for output to the coefficient calculator 105. The coefficient calculator 105 converts the two differentials to their absolute values and calculates the multiplication coefficients p and q using the equations (2) and (3). Meanwhile, the chrominance signal fed to the input terminal 106 is filtered through multiplication of $C_{i-1}$, $C_i$, and $C_{i+1}$ by p and q with their respective multipliers 109, 111, and 110 and summation of the resultant products with the adder 112 using the equation (1).

For description in more detail of operation of the equations (1), (2), and (3), three cases with variation in the luminance signal are assumed as shown in FIGS. 5-a, 5-b and 5-c. The three cases are expressed, using the equation (1), by:

$$\text{(i)} \ |Y_{i-1} - Y_i| = |Y_i - Y_{i+1}| \quad (1a)$$
$$C_i' = 1/4 C_{i-1} + 1/2 C_i + 1/4 C_{i+1}$$

$$\text{(ii)} \ |Y_{i-1} - Y_i| \gg |Y_i - Y_{i+1}| \quad (1b)$$
$$C_i' = 1/2 C_i + 1/2 C_{i+1}$$

$$\text{(iii)} \ |Y_{i-1} - Y_i| \ll |Y_i - Y_{i+1}| \quad (1c)$$
$$C_i' = 1/2 C_{i-1} + 1/2 C_i$$

The first case (i) exhibits no change in the luminance signal and thus, the filter device acts as a 3-tap linear phase filter of which action is equal to that of a conventional filter device and expressed by the equation (1a). The other two cases (ii) and (iii) indicate that the luminance signal carries edge image data and thus, the chrominance signal is filtered corresponding to the correlation between pixel data of the luminance signal. Accordingly, when the correlation between the chrominance and luminance signal data at the same pixel position is high or their respective edge patterns are precisely overlapped each other, no color fringing will appear because the edge of the chrominance signal is restored. It is now understood that the present invention is not limited to the foregoing three cases in which variations in the luminance signal are great and its filtering action corresponding to the correlation between pixel data of the luminance signal will with equal success be performed at any other case using the equations (1), (2), and (3).

FIG. 7 is a block diagram showing another arrangement of a coefficient calculating means in which a coefficient selector 114 is added. In particular, the two coefficients p and q calculated by the coefficient calculator 105 are not directly used for multiplication. They are fed to the coefficient selector 114 which is provided with a plurality of predetermined coefficient pairs. In accordance with p and q, the coefficient selector 114 selects one coefficient pair and delivers them as a pair of given coefficients to the corresponding multipliers. As the result, the hardware complexity of the filter device will be facilitated with the use of a filter coefficient equal to the n-th power of $\frac{1}{2}$.

As set forth above, the third embodiment of the present invention provides an improved filtering action for line decimation of data of the chrominance signal in which if the correlation between the chrominance and luminance data is high, color fringing in the edge pattern of the chrominance signal will hardly be generated and no aliasing distortion will appear.

Figure 8:
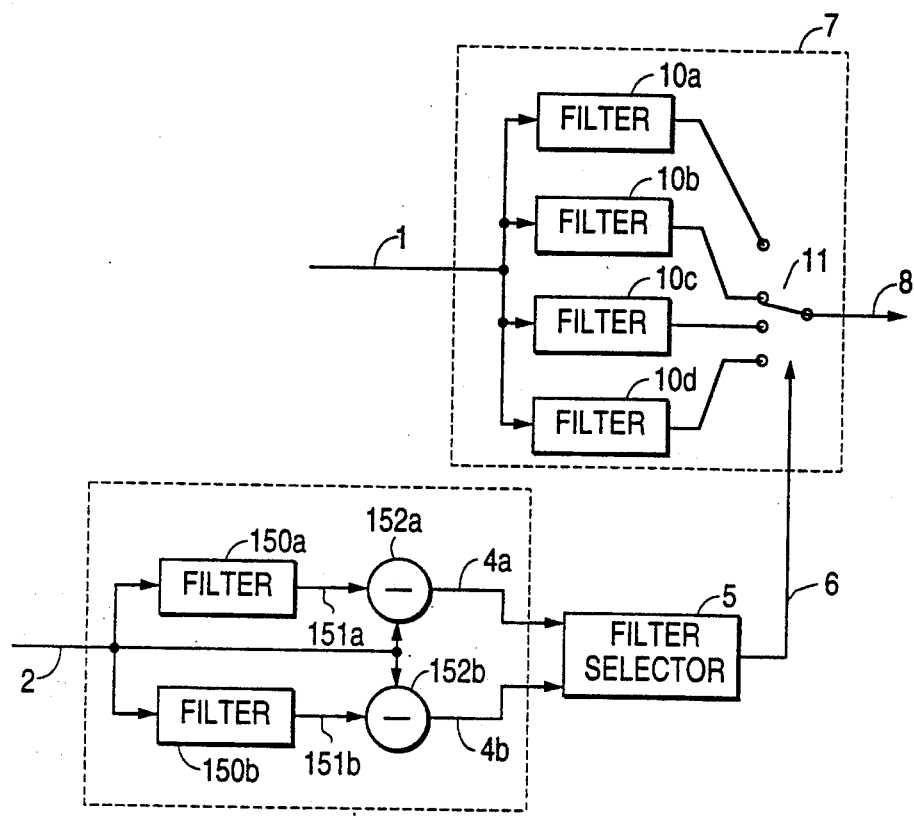
FIG. 8 is a block diagram of a chroma signal decimation filter device showing a fourth embodiment of the present invention.

FIG. 8 is a block diagram of a chroma signal decimation filter device showing a fourth embodiment of the present invention. Illustrated in FIG. 8 are a pair of filters 150a and 150b for filtering a luminance signal 2, output signals 151a and 151b from their respective filters 150a and 150b, two subtracters 152a and 152b, difference signals 4a and 4b from their respective subtracters 152a and 152b, a filter 10a for improving the quality of a picture which contains no edge pattern, a filter 10b for improving the quality of a picture which shows an edge pattern between two pixels, a filter 10c for improving the quality of a picture shows an edge pattern in the front, and a filter 10d for improving the quality of a picture which show an edge pattern in the rear.

The operation of the above fourth embodiment will be described. The filters 150a and 150b are arranged for emphasizing the edge pattern in front and rear of decimated pixel data respectively. The edge emphasized signals 151a and 151b are fed to their respective subtracters 152a and 152b where they are subtracted from the input signal 2. The resultant difference signals 4a and 4b represent the magnitude of the edge pattern data. More particularly, if 4a is greater than 4b, the edge pattern exists in the front and if 4b is greater than 4a, it appears in the rear. Accordingly, a filter selector 5 determines the optimum filter from the four different cases:

(i) no edge is present;
(ii) two edge patterns in both the front and rear;
(iii) edge pattern appears in the front; and
(iv) edge pattern in the rear.

For example, the filter 10a is selected in case of (i), the filter 10b in case of (ii), the filter 10c in case of (iii), and the filter 10d in case of (iv).

Figure 9:
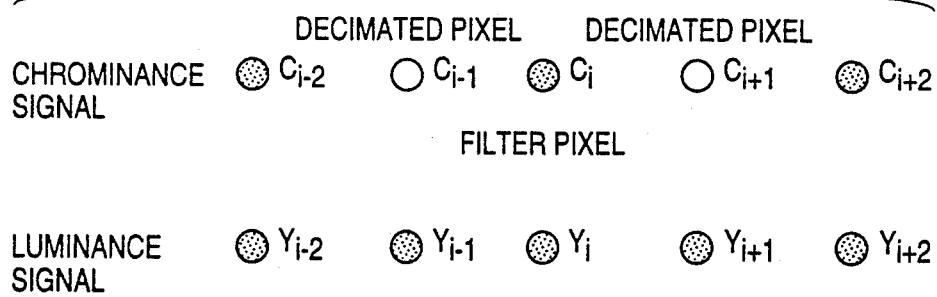
FIG. 9 is an explanatory illustration showing the pixel data arrangement of both a chrominance signal and a luminance signal.

A procedure of edge pattern detection will now be explained. As best shown in FIG. 9, white dots represent pixel data to be decimated and black dots are pixel data not to be decimated. It is assumed that the filtering action is executed about the pixel $C_i$. In an interpolation filter device, both $C_{i-1}$ and $C_{i+1}$ are interpolated between $C_{i-2}$ and $C_i$ and $C_i$ and $C_{i+2}$ respectively. Accordingly, during the filtering action, an examination is made not only as to whether or not the edge pattern appears on both the sides of $C_i$ but also whether or not the edge pattern appears between $C_{i-2}$ and $C_{i-1}$ and between $C_{i-1}$ and $C_{i+2}$. As the result, the selection of an optimum filter conducted by the detection of the edge pattern at a high accuracy and thus, the quality of a reproduced picture will be improved. In other words, an examination is made as to whether or not the edge pattern appears between pixels $Y_{i-2}$, $Y_{i-1}$, $Y_i$, $Y_{i+1}$, and $Y_{i+2}$ of the luminance signal.

Figure 10:
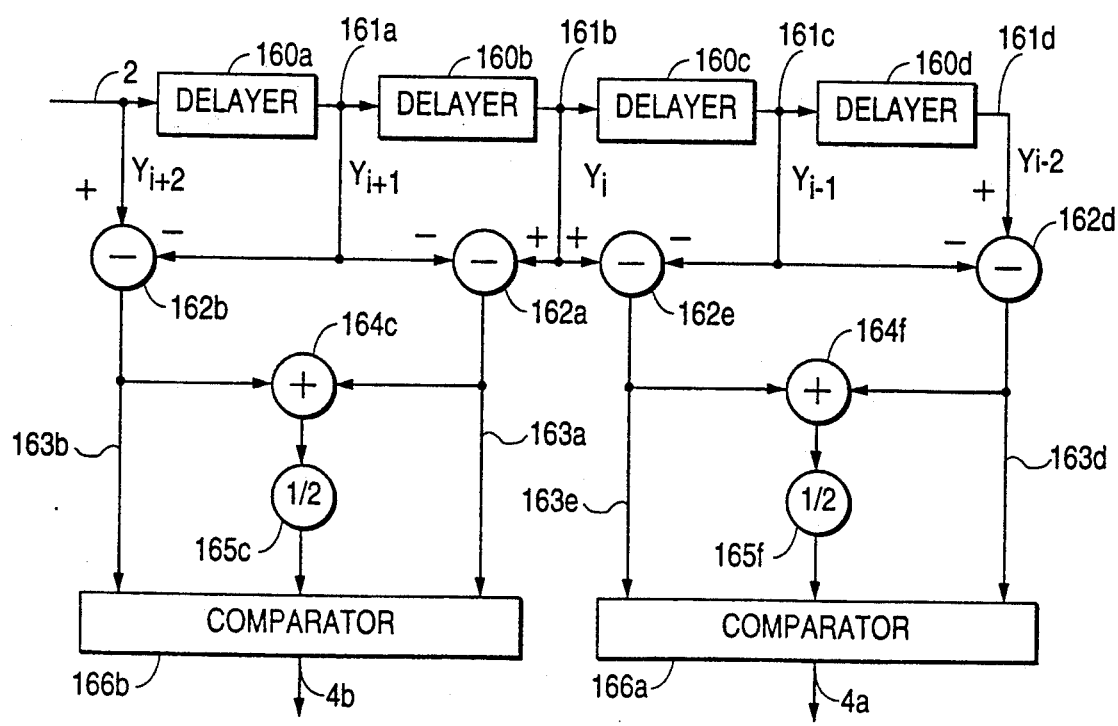
FIG. 10 is a block diagram showing an arrangement of a correlation detector.

FIG. 10 is a block diagram showing a correlation detector for detection of the edge pattern by the foregoing procedure. Illustrated are an luminance signal 2, four delayers 160a, 160b, 160c, and 160d for producing delay signals from the luminance signal, delay signals 161a, 161b, 161c, and 161d from their respective delayers 160a, 160b, 160c, and 160d, four subtracters 162a, 162b, 162d, and 162e, difference signals 163a, 163b, 163d, and 163e from their respective subtracters 162a, 162b, 162d, and 162e, a pair of adders 164c and 164f, two shifters 165c and 165f for multiplication by $\frac{1}{2}$, two comparators 166a and 166b, and output signals 4a and 4b from their respective comparators 166a and 166b.

The operation of the correlation detector having the above arrangement will be explained. The correlation detector is designed for detecting whether the edge pattern appears between $Y_{i-2}$, $Y_{i-1}$, $Y_i$, $Y_{i+1}$, and $Y_{i+2}$ of the luminance signal in order to determine an appropriate filter for decimation of pixel data about the pixel $C_i$ shown in FIG. 9. The input luminance signal 2 is fed to a row of the delayers 160a, 160b, 160c, and 160d where delay signals are produced. If the input luminance signal 2 is $Y_{i+2}$, the delay signals 161a, 161b, 161c, and 161d are $Y_{i+1}$, $Y_i$, $Y_{i-1}$, and $Y_{i-2}$. Hence, the difference signals 163a, 163b, 163d, and 163e from their respective subtracters 162a, 162b, 162d, and 162e are equal to $Y_{i+2}-Y_{i+1}$, $Y_i-Y_{i+1}$, $Y_{i-2}-Y_{i-1}$, and $Y_i-Y_{i-1}$ respectively. They are then summed by the adders 164c and 164f to form two sum signals which are in turn multiplied by $\frac{1}{2}$ with the multipliers 165c and 165f respectively. Thus, the output signals of their respective multipliers 165c and 165f become $Y_{i+2}/2+Y_i/2-Y_{i+1}$ and $Y_{i-2}/2+Y_i/2-Y_{i-1}$. The comparator 166b performs comparison between the absolute values of $Y_{i+2}-Y_{i+1}$, $Y_i-Y_{i+1}$, and $Y_{i+2}/2+Y_i/2-Y_{i+1}$ and delivers the least value as an output. More particularly, if the absolute value of $Y_{i+2}-Y_{i+1}$ is the least, it is determined that the edge pattern appears between $Y_i$ and $Y_{i+1}$. If the absolute value of $Y_i-Y_{i+1}$ is the least, it is determined that the edge pattern appears between $Y_{i+2}$ and $Y_{i+1}$. If the absolute value of $Y_{i+2}/2+Y_i/2-Y_{i+1}$ is the least, it is determined that no edge pattern appears between $Y_i$ and $Y_{i+2}$. The resultant output of the comparator 166b is delivered as the signal 4b. Similarly, the comparator 166a performs comparison between the absolutes values of $Y_{i-2}-Y_{i-1}$, $Y_i-Y_{i-1}$, and $Y_{i-2}/2+Y_i/2-Y_{i-1}$ and delivers the least value as an output. More specifically, if the absolute value of $Y_{i-2}-Y_{i-1}$ is the least, it is determined that the edge pattern appears between $Y_i$ and $Y_{i-1}$. If the absolute value of $Y_i-Y_{i-1}$ is the least, it is determined that the edge pattern appears between $Y_{i-2}$ and $Y_{i-1}$. If the absolute value of $Y_{i-2}/2+Y_i/2-Y_{i-1}$ is the least, it is determined that no edge pattern appears between $Y_i$ and $Y_{i-2}$. The resultant output of the comparator 166a is delivered as the signal 4a. In this manner, the existence of an edge pattern about the pixel $Y_i$ can be detected.

Figure 11:
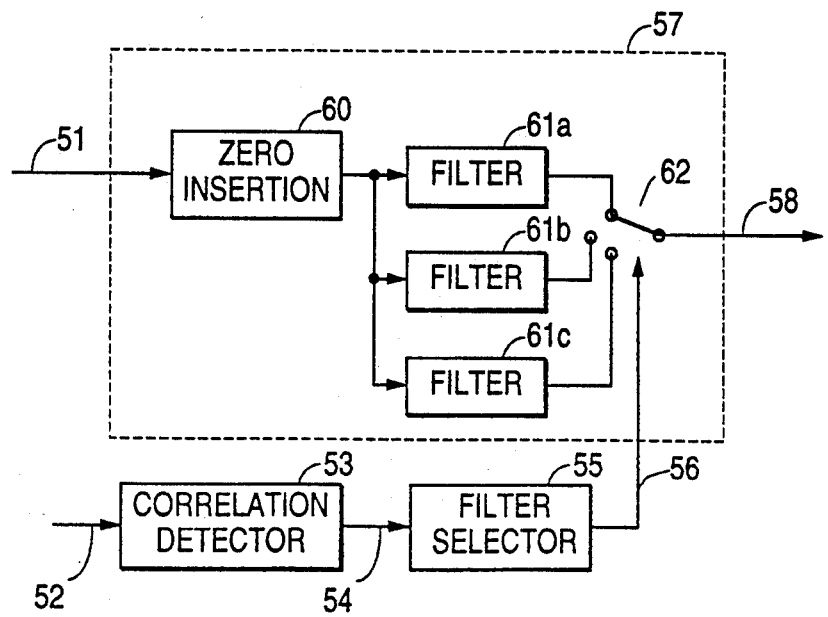
FIG. 11 is a block diagram of a chroma signal interpolation filter device showing a fifth embodiment of the present invention.

FIG. 11 is a block diagram of a chroma signal interpolation filter device showing a fifth embodiment of the present invention. Illustrated in FIG. 11 are an input chrominance signal 51, an input luminance signal 52, a correlation detector 53 for calculating a correlation between two data of the luminance signal 52, a correlation signal 54, a filter selector 55 for selecting a filter to be used, a filter selecting signal 56 for activating the filter selected by the filter selector 55, and a filter unit 57 for filtering the input chrominance signal 51. The filter unit 57 comprises a zero-value insertion unit 60 for insertion of a 0 into the interpolated pixel value of the input chrominance signal 51, three filters 61a, 61b, and 61c for filtering an output signal of the zero-value insertion unit 60, and a selector switch 62 for connecting one of the three filters 61a, 61b, and 61c of which an output is delivered as an output signal 58 of the filter device.

The operation of the chroma signal interpolation filter device of the fifth embodiment having the foregoing arrangement will now be described. The input luminance signal 52 is fed to the correlation detector 53 where a correlation between pixel data is calculated. If the correlation is high, the input luminance signal 52 carries an image data which exhibits a relatively flat pattern throughout the pixels. If it is low, the image data represents a sharp edge or outline pattern of picture. The chrominance signal is closely related to the luminance signal and if the luminance signal contains a sharp edge or outline image data, it will, at a high probability, carry similar data about the same location of a picture screen. In operation, the filter selector 55 is hence actuated to select through the action of the selector switch 62 one of the three filters 61a, 61b, and 61c for optimum filtering of the input chrominance signal 51. More particularly, if the correlation is high, the filter 61a is selected for performing an ultimate interpolation on a flat pattern. If it is low, either the filter 61b or 61c is selected depending on the location (in the front or rear) of an edge pattern. For filtering both the interpolated pixel data and the pixel data to be used for interpolation of the input chrominance signal 51 at an equal level, a zero-value insertion unit 60 is provided for presetting the interpolated data value to 0.

As understood, the filter unit 57 containing the three filters 61a, 61b, and 61c and the selector switch 62 is controlled by the filter selector 55 for activating the most favorable filter for enhancing the quality of a picture which exhibits an edge or flat pattern, thus minimizing a reduction of the picture quality which is inherent in a conventional chroma signal interpolation filter device.

Figure 12:
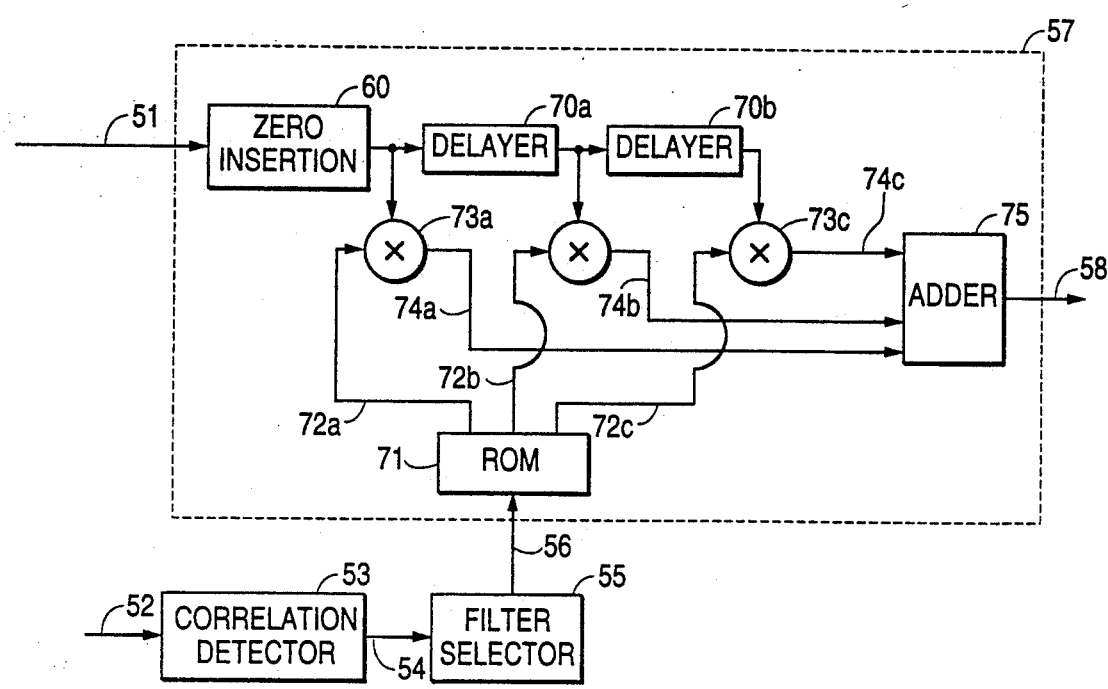
FIG. 12 is a block diagram of a chroma signal interpolation filter device showing a sixth embodiment of the present invention.

FIG. 12 is a block diagram of a chroma signal interpolation filter device showing a sixth embodiment of the present invention, in which a correlation detector 53 and a filter selector 55 are identical in arrangement to those of the fifth embodiment shown in FIG. 11 while a filter unit 57 is different. The filter unit 57 comprises two delayers 70a and 70b for producing a delay of an input chrominance signal 51, a ROM 71 arranged for delivering three different outputs 72a, 72b, and 72c on receiving an output signal 56 of the filter selector 55, three multipliers 73a, 73b, and 73c for multiplication of the input signal 51 by the output 72a, a delay signal of the delayer 70a by the output 72b, and a delay signal of the delayer 70b by the output 72c respectively, and an adder 75 for summing product signals 74a, 4b, and 74c of their respective multipliers 73a, 73b, and 73c to form a sum signal which is in turn delivered as the filter output 58.

The operation of the chroma signal interpolation filter device of the sixth embodiment having the foregoing arrangement will be explained. The sixth embodiment is different from the fifth embodiment shown in FIG. 11 by the arrangement of the filter unit in which the selection from the three filters 61a, 61b, and 61c with the selector switch 62 is substituted with the arithmetic operation of three different filter coefficients for producing different filter effects. The filter unit 57 shown in FIG. 12 forms a three-tap filter associated with the three filter coefficients 72a, 72b, and 72c The filter coefficients 72a, 72b, and 72c are derived from three discrete address data of the ROM 71 and released upon receipt of the output signal 56 of the filter selector 55. It is understood that the sum of the filter coefficients 72a and 72c is 1 and also, 72b is 1 so that the energy of an output chrominance signal which has been filtered becomes equal to that of the input chrominance signal 51. Also, the three filter coefficients 72a, 72b, and 72c of the ROM 71 are predetermined so that if the filter selector 55 detects that the luminance signal carries edge image data, they provide a filtering action for enhancing the quality of an edge pattern and if not, a filtering action for enhancing the quality of a flat pattern. The filter coefficients 72a, 72b, and 72c are multiplied by the input signal 51, the delay signal of the delayer 70a, and the delay signal of the delayer 70b respectively to the product signals 74a, 74b, and 74c. The product signals 74a, 74b, and 74c are then summed up by the adder 75 to form the filter output 58.

FIG. 13 is a block diagram of a line interpolation filter device, another form of the chroma signal interpolation filter device, showing a seventh embodiment of the present invention. As shown, there are provided an input terminal 200 for receiving a luminance signal, a pair of 1H delayers 201 and 202, two subtracters 203 and 204 for calculating a differential between two line data, a coefficient calculator 205 for calculating two multiplication coefficients p and q from the difference signals of the subtracters 203 and 204, an input terminal 206 for receiving a chrominance signal, a pair of 1H delayers 207 and 208, two multipliers 209 and 210, an adder 211 for summing the product signals from their respective multipliers 209 and 210 and the delay signal from the 1H delayer 207, and an output terminal 213 for delivering a sum signal. The operation of the above arrangement will be explained.

It is assumed, similar to the third embodiment shown in FIG. 3, that a pixel data of the chrominance signal is denoted by $C_i$ and two, upper and lower, pixel data next to the pixel $C_i$ situated on the preceding and succeeding lines are represented by $C_{i-1}$ and $C_{i+1}$ respectively. Equally, a pixel data of the luminance signal at the same location of a screen as of the pixel $C_i$ is denoted by $Y_i$ and its two adjacent pixel data on the preceding and succeeding lines are represented by $Y_{i-1}$ and $Y_{i+1}$ respectively. The interpolation filtering of the chrominance signal is executed through examining the data of $Y_i$, $Y_{i-1}$, and $Y_{i+1}$. FIGS. 14-a and 14-b 5 illustrate the luminance signal and the chrominance signal respectively. More specifically, the filtering of $C_i$ is expressed by:

$$C_i' = pC_{i-1} + 1/2 C_i + qC_{i+1} \quad (4)$$
$$(p + q = 1)$$

The coefficients p and q are determined by the two differentials between the current line and its preceding and succeeding lines of the luminance signal as calculated using the following equations (5) and (6), in which b is a constant provided for the same purpose as of the constant a of the equation (1).

$$p = \frac{|Y_i - Y_{i+1}| + b}{|Y_{i-1} - Y_i| + b + |Y_i - Y_{i+1}| + b} \quad (5)$$

$$q = \frac{|Y_{i-1} - Y_i| + b}{|Y_{i-1} - Y_i| + b + |Y_i - Y_{i+1}| + b} \quad (6)$$

As shown in FIG. 13, the luminance signal fed from the input terminal 200 is examined by the subtracters 203 and 204 in which the differentials $Y_{i-1} - Y_i$ and $Y_i - Y_{i+1}$ between the lines are calculated respectively for output to the coefficient calculator 205. The coefficient calculator 205 converts the two differentials to their absolute values and calculates the multiplication coefficients p and q using the equations (5) and (6). Meanwhile, the chrominance signal processed by zero insertion and fed to the input terminal 206 is filtered through multiplication by p and q with the multipliers 209 and 210 and summation of the resultant products with the adder 212 using the equation (4).

The chrominance signal fed from the input terminal 206 which has been processed by line decimation is now interpolated with 0s at the pixel points on each decimated line. More particularly, this action is expressed as, using the equation (4):

$$C_i \neq 0: C_i' = C_i$$
$$C_i = 0: C_i' = pC_{i-1} + qC_{i+1}$$

The principle of the filtering action is identical to that for the line decimated signal. Accordingly, when the correlation between the chrominance and luminance signal data at the same pixel position is high and their respective edge patterns precisely overlap each other, no color fringing will appear because the edge components of the chrominance signal are restored. The determination of filter coefficients in this embodiment will also be carried out by the same procedure as depicted in FIG. 7.

As set forth above, the seventh embodiment of the present invention provides an improved filtering action for interpolation of the line decimated chrominance signal in which if the correlation between the chrominance and luminance data is high, color fringing in the edge pattern of the chrominance signal will hardly be generated and no aliasing distortion will appear.

Figure 15:
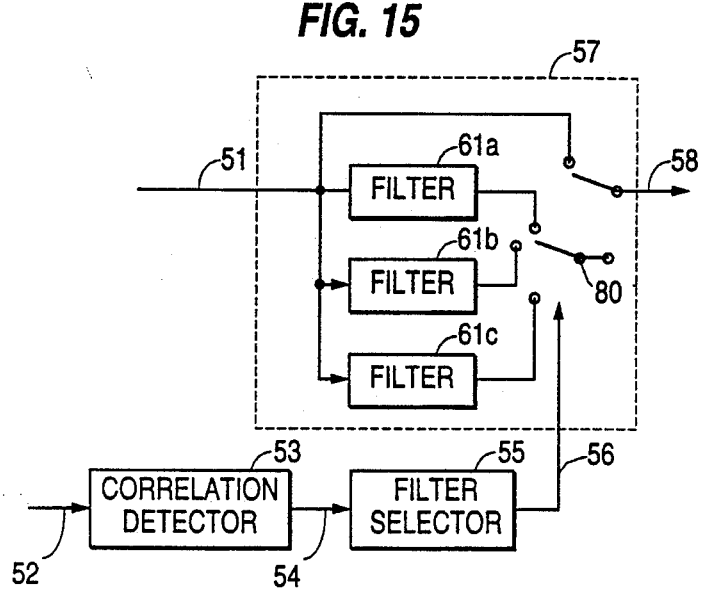
FIG. 15 is a block diagram of a chroma signal interpolation filter device showing a eighth embodiment of the present invention.

FIG. 15 is a block diagram of a chroma signal interpolation filter device showing a eighth embodiment of the present invention, in which a correlation detector 53 and a filter selector 55 are identical in the arrangement to those of the fifth embodiment shown in FIG. 11 while a filter unit 57 is different. The filter unit 57 comprises three filters 61a, 61b, and 61c for filtering the interpolated pixel value of an the input chrominance signal 51, a selector switch 62 activated by a signal 56 from the filter selector 55 for connecting one of the three filters 61a, 61b, and 61c of which an output is delivered as an output signal 58 of the filter device, and a selector switch 80 for directly transmitting a component other than the interpolated pixel data of the input chrominance signal 51 to the output by switching actions which are triggered at equal intervals.

The operation of the chroma signal interpolation filter device of the eighth embodiment having the foregoing arrangement will now be described. The action of the correlation detector 53 and the filter selector 55 is the same as of those shown in FIG. 11. In operation, the filter selector 55 is hence actuated to select through the action of the selector switch 62 one of the three filters 61a, 61b, and 61c for optimum filtering of the input chrominance signal 51. More particularly, if the correlation between two data is high, the filter 61a is selected for performing an ultimate interpolation on a flat pattern data. If it is low, either the filter 61b or 61c is selected depending on the location of an edge pattern. The filtering action of the filter 61a, 61b, or 61c needs to work on the interpolated pixel component of the signal but not the other component. Hence, the selector switch 80 performs a periodic switching action for if the interpolated pixel data is involved, passing the output of a selected filter and if not, transmitting the input chrominance signal 51 directly across the filter unit 57. As the result, the number of pixel data to be filtered is decreased as compared with the fifth embodiment shown in FIG. 11 and thus, the speed of the filtering action will be increased.

As understood, the filter unit 57 containing the three filters 61a, 61b, and 61c, the selector switch 62, and the extra selector switch 80 is controlled by the filter selector 55 for activating the most favorable filter for enhancing the quality of a picture which exhibits an edge or flat pattern, thus minimizing a reduction in the picture quality during the filtering action.

Figure 16:
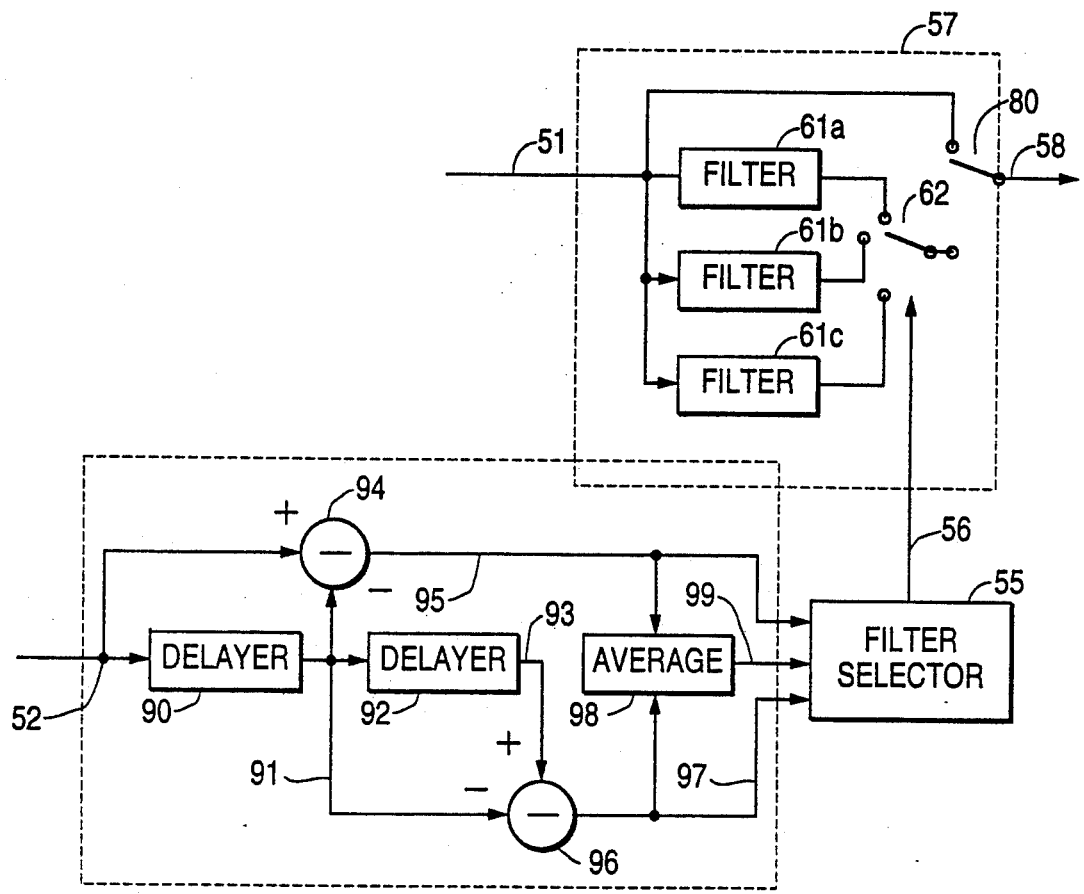
FIG. 16 is a block diagram of a chroma signal interpolation filter device showing a ninth embodiment of the present invention.

FIG. 16 is a block diagram of a chroma signal interpolation filter device showing a ninth embodiment of the present invention. In the ninth embodiment, another form of the correlation detector 53 of the eighth embodiment is provided comprising a pair of delayers 90 and 92 for producing two delay signals 91 and 93 respectively, two subtracters 94 and 96 for producing two difference signals 95 and 97 respectively, and an average calculator 98 for calculating an average value 99.

The operation of the chroma signal interpolation filter device of the ninth embodiment having the above arrangement will be explained. The correlation detector 53 is designed for detecting whether the edge pattern exists in the front and rear of the pixel data of an input luminance signal situated at the same location of an interpolated pixel data of a chrominance signal. It is assumed that the luminance signal pixel is $Y_i$ and its preceding and succeeding pixels are $Y_{i-1}$ and $Y_{i+1}$ respectively. If the delay signal 91 is $Y_i$, the input signal 52 and the delay signal 93 are $Y_{i+1}$ and $Y_{i-1}$. Hence the difference signals 95 and 97 from their respective subtracters 94 and 96 are equal to $Y_{i+1} - Y_i$ and $Y_{i-1} - Y_i$ respectively and the average signal 99 of the average calculator 98 is expressed as $Y_{i+1}/2 + Y_{i-1}/2 - Y_i$. It is now compared with the absolute values of the signals 95, 97, and 98. If the absolute value of the signal 98 is the least, it is determined that no edge pattern is present and the interpolation on the chrominance signal is carried out using the filter 61a for enhancing the quality of a flat pattern. If the absolute value of the signal 95 is the least, it is determined that the edge pattern appears between $Y_i$ and $Y_{i-1}$ and the interpolation is conducted with the filter 61b for enhancing the quality of the edge pattern in the front. If the absolute value of the signal 97 is the least, the interpolation is carried out with the filter 61c for enhancing the edge pattern in the rear.

With the use of the foregoing correlation detector, the chroma signal interpolation filter device will be simple in the hardware arrangement yet ensuring ultimate filtering capability.

Figure 17:
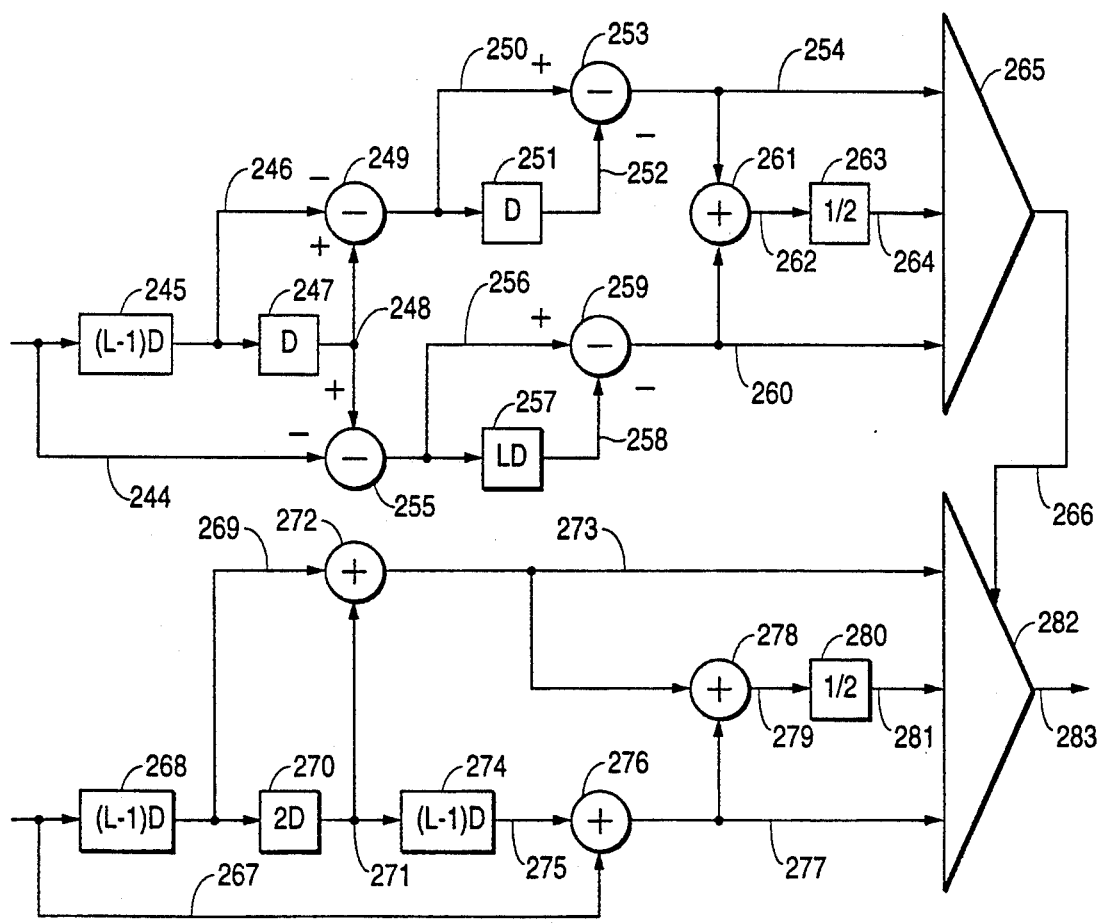
FIG. 17 is a block diagram of a chroma signal interpolation filter device showing a tenth embodiment of the present invention.

FIG. 17 is a block diagram of a chroma signal interpolation filter device showing a tenth embodiment of the present invention. Illustrated are an input luminance signal 244, a delayer 245 for producing a (one line −1)-pixel delay, a delay output 246 of the delayer 245, a delayer 247 for producing a 1-pixel delay, a delay output 248 of the delayer 247, a subtracter 249, a difference signal 250 of the subtracter 249, a delayer 251 for producing a 1-pixel delay, a delay output 252 of the delayer 251, a subtracter 253, a difference signal 254 of the subtracter 253, a subtracter 255, a difference signal 256 of the subtracter 255, a delayer 257 for producing a 1-line delay, a delay output 258 of the delayer 257, a subtracter 259, a difference signal 260 of the subtracter 259, an adder 261, a sum signal 262 of the adder 261, a divider 263, a quotient signal 264 of the divider 263, a comparator 265 for comparison between the difference signal 254. The difference signal 260, and the quotient signal 264, a comparison signal 266 of the comparator 265, an input chrominance signal 267, a delayer 268 for producing a (one line −1)-pixel delay, a delay output 269 of the delayer 268, a delayer 270 for producing a 2-pixel delay, a delay output 271 of the delayer 270, an adder 272, a sum signal 273 of the adder 272, a delayer 274 for producing a (one line −1)-pixel delay, a delay signal 275 of the delayer 274, an adder 276, a sum signal 277 of the adder 276, an adder 278, a sum signal 279 of the adder 278, a divider 280, a quotient signal 281 of the divider 280, and a selector 282 for producing a chrominance interpolation signal 283 through selection of the sum signals 273 and 277 and the quotient signal 281.

Figure 19:
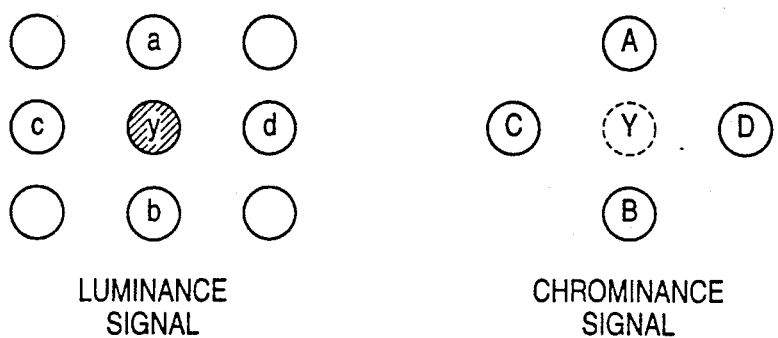
FIG. 19 is an explanatory illustration showing the pixel data arrangement of both a chrominance signal and a luminance signal.

The operation of the chroma signal interpolation filter device having the foregoing arrangement will be explained. It is assumed that the pixel data of the input chrominance signal 267 has been decimated thus forming an array of checkerboard pattern, as shown in FIG. 18. The pixels denoted by the solid lines remain intact while the pixels denoted by the broken lines are illuminated. This diagonal decimation technique is employed for compressing abundant data in view of the fact that visual sensitivity becomes low in the frequency characteristic of diagonal directions. FIG. 19 is an explanatory view of interpolation in the embodiment, showing an enlargement of FIG. 18. In FIG. 19, Y represents a pixel data of the chrominance signal to be interpolated and A, B, C, and D are existing data pixels. Also, a data pixel of the luminance signal at the same location as of Y is denoted by the letter y and pixels a, b, c, and d correspond to A, B, C, and D respectively. The criteria for comparing action of an interpolating means is expressed as:

if $|y-y_i| \leq |y-y_2|$ and $|y-y_i| \leq |y-y_3|$, the $Y = (A+B)/2$, if $|y-y_2| \leq |y-y_i|$ and $|y-y_2| \leq |y-y_3|$, then $Y = (C+D)/2$, if $|y-y_3| \leq |y-y_i|$ and $y-y_3| \leq |y-y_2|$, then $Y = (A+B+C+D)/4$, where $y_i = (a+b)/2$, $y_2 = (c+d)/2$, and $y_3 = (a+b+c+d)/4$.

In action, the input luminance signal 244 is fed to the delayer 245 where it is delayed by (one line-1)-pixel to determine the pixel d. The delay signal 246 is then 1-pixel delayed by the delayer 247 for determining the pixel y. The subtracters 249 and 255 perform subtraction of the delay signal 246 and the input luminance signal 244 from the delay signal 248 respectively thus producing $(y-d)$ and $(y-b)$. The difference signal 250 is 1-pixel delayed by the delayer 251 into the delay signal 252 which is then subtracted from the difference signal 250 at the subtracter 253. Hence, the difference signal 254 is $(2y-c-d)$ which is equivalent to $2(y-y_2)$. Similarly, the difference signal 256 is 1-line-pixel delayed by the delayer 257 into the delay signal 258 which is then subtracted from the difference signal 256 at the subtracter 259. Hence, the difference signal 260 is $2(y-y_i)$. The two difference signals 254 and 260 are summed up by the adder 261 into the sum signal 262 which is then divided by two at the divider 263 into the quotient signal 264 equal to $2(y-y_3)$. The absolute values of the difference signals 254 and 260 and the quotient signal 264 are compared by the comparator 265 which in turn delivers the comparison signal 266 instructing a desired interpolation procedure by which the absolute value is minimized. The input chrominance signal 267 is fed to the delayer 268 where it is delayed by (one line-1)-pixel into the delay signal 269. The delay signal 269 is further 2-pixel delayed by the delayer 270 into the delay signal 271. The two delay signals 269 and 271 are summed by the adder 272 into the sum signal 273 which is equal to $(C+D)$. Also, the delay signal 271 is (one line-1)-pixel delayed by the delayer 274 into the delay signal 275 which is then summed with the input chrominance signal 267 by the adder 276 into the sum signal 277 which is equal to $(A+B)$. The two sum signals 273 and 277 are summed up by the adder 278 into the sum signal 279 which is in turn divided by two at the divider 280 into the quotient signal 281 which is equivalent to $(A+B+C+D)/2$. The selector 282 selects one of the two sum signals 273 and 277 and the quotient signal 281 which corresponds to the interpolating means determined by the comparison signal 266 and then delivers it as the chrominance interpolation signal 283. It is noted that the output of the chroma signal interpolation filter device of this embodiment is not normalized and hence, should be multiplied by ½ at either the input or output end of the device.

As set forth above, each embodiment of the present invention allows the chrominance signal to be interpolated by three discrete, vertical, horizontal, and planar, interpolation techniques so that a reproduced image of interpolated data can be enhanced in quality using a relatively simple hardware arrangement.

Figure 20:
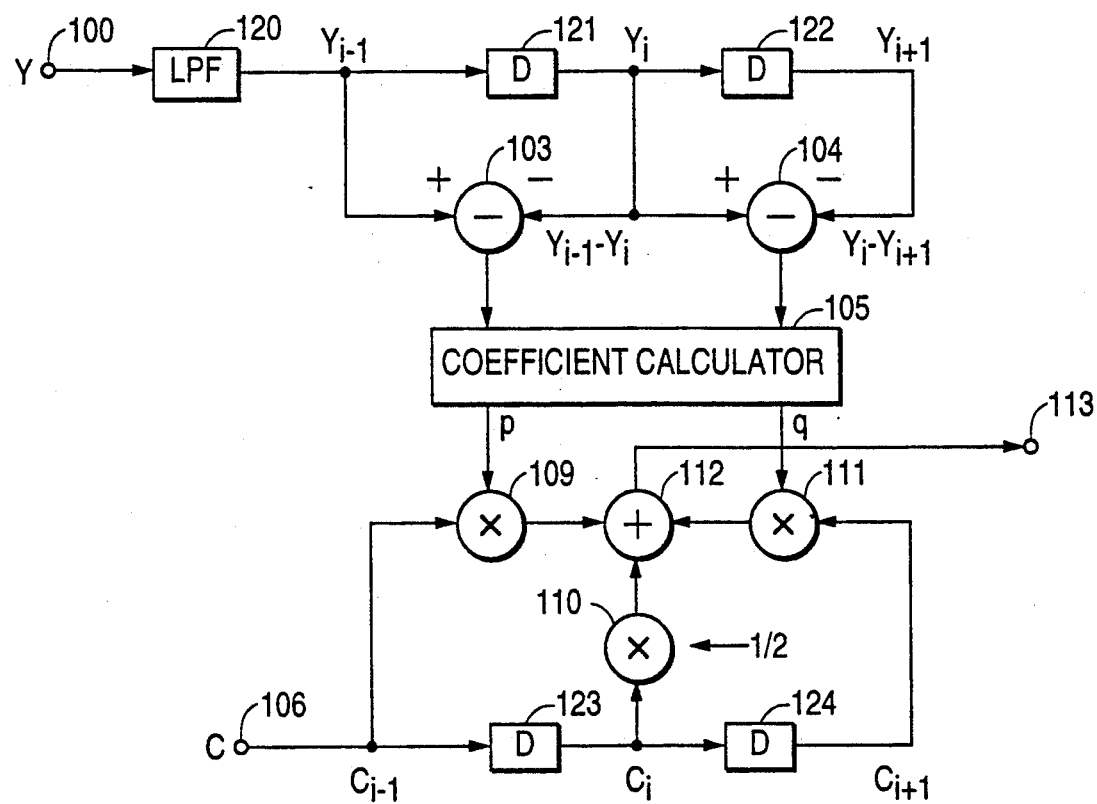
FIG. 20 is a block diagram of the chroma signal decimation filter device of the third embodiment for decimation of horizontal data.
Figure 21:
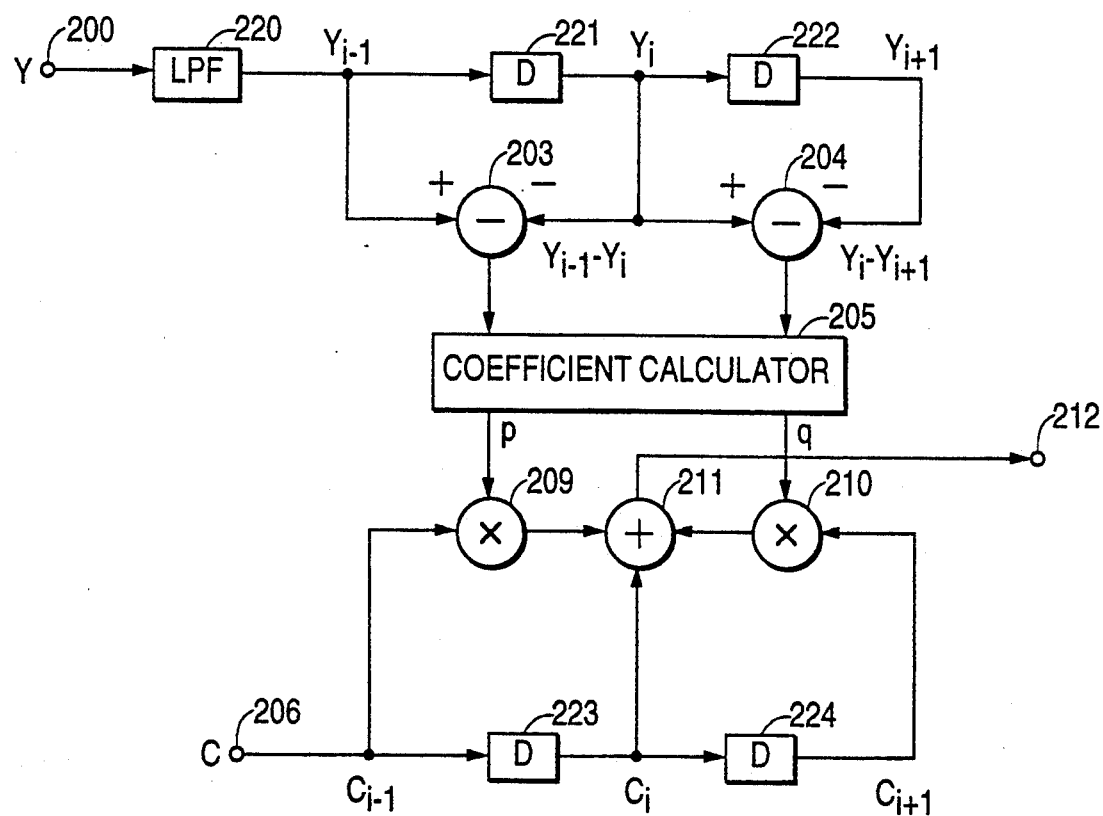
FIG. 21 is a block diagram of the chroma signal decimation filter device of the seventh embodiment for interpolation of horizontal data.

Although the embodiments shown in FIGS. 3 and 13 illustrate decimation and interpolation of line data of the chrominance signal, horizontal pixel data will also be decimated or interpolated with equal success by the filter device of the present invention. FIG. 20 is a block diagram showing the decimation of horizontal pixel data according to the present invention, in which there are provided a lowpass filter 120 for decimation of data and four 1-pixel delayers 121, 122, 123, and 124. In common, the luminance signal is sampled by frequencies of a multiple of an integer of the chrominance signal and the number of its samples in each horizontal scanning period becomes n times (n is an integer) that of the chrominance signal. For example, if the luminance signal is sampled by a frequency two time greater than that of the chrominance signal, the number of samples is two times that of the chrominance signal. Simultaneously, its frequency bandwidth for transmission is also doubled. When the luminance signal having such a two-time bandwidth is correlation detected, its aliasing component causes erratic filtering of the chrominance signal. Accordingly, the bandwidth of the luminance signal is reduced to ½ by the lowpass filter 120 prior to the data decimation and filter coefficients for decimation of the chrominance signal is determined by detecting a correlation between pixel data of the luminance signal which correspond those of the chrominance signal in the respect of position and bandwidth. Similarly, FIG. 21 is a block diagram showing the interpolation of horizontal pixel data according to the present invention, in which there are provided a lowpass filter 220 for data interpolation and four 1-pixel delayers 221, 222, 223, and 224. The processing of the luminance signal by the arrangement shown in FIG. 21 is similar to that of the data decimation. More particularly, the luminance signal is bandlimit filtered and interpolated by the lowpass 220 filter and a correlation between two data thereof is detected for calculating filter coefficients for interpolation of the chrominance signal.

Both the chroma signal decimation filter device and the chroma signal interpolation device of the present invention are almost identical in the arrangement and can commonly be used for decimation and interpolation by shifting their filter coefficients from decimation values to interpolation values or vice versa. For example, the correlation values p and q and the decimation or interpolation coefficients for C1 shown in FIGS. 3 and 13 may be varied for desired filtering action without changing the arrangement of components.

Also, the number of filter taps and the setting of coefficients are not limited to the embodiments of the present invention which are only illustrative. They will arbitrarily be determined in respect to the accuracy of filtering action and the feasibility of hardware.

What is claimed is:

1. A chroma signal decimation filter device comprising:
   a correlation detector for detecting a correlation between pixel data of a luminance signal which correspond in the positional assignment of a picture screen to those of a chrominance signal to be decimated;
   a filter unit for performing at least two different filtering operations using a target pixel data and its adjacent pixel data of the chrominance signal; and
   a filter selector for determining one of said at least two filtering operations to be performed by the filter unit in accordance with the correlation between the pixel data of the luminance signal detected by the correlation detector;
   wherein the filter unit changes filter coefficients having changeable values and the filter selector determines the values of the filter coefficients of the filter unit in accordance with the correlation between the pixel data of the luminance signal detected by the correlation detector;
   and wherein if the target pixel data to be decimated and its two adjacent, front and rear, data of the chrominance signal are Ci, Ci−1, and Ci+1 respectively, the correlation detector outputs two correlation values p and q, and the filter unit outputs a signal ci' expressed as:

$$C_i' = pC_{i-1} + 1/2C_1 + qC_{i+1} \quad (1)$$
$$(p + q = 1/2).$$

2. A chroma signal decimation filter device according to claim 1, wherein if pixel data of the luminance signal corresponding to Ci, Ci−1, and Ci+1 of the chrominance signal in the positional assignment are Yi, Yi−1, and Yi+1 and a constant is a, the filter unit calculates the correlation values p and q as follows:

$$p = \frac{1}{2} \times \frac{|Y_i - Y_{i+1}| + a}{|Y_{i-1} - Y_i| + a + |Y_i - Y_{i+1}| + a} \quad (2)$$

$$q = \frac{1}{2} \times \frac{|Y_{i-1} - Y_i| + a}{|Y_{i-1} - Y_i| + a + |Y_i - Y_{i+1}| + a} \quad (3)$$

3. A chroma signal interpolating filter device comprising;
   a correlation detector for detecting a correlation between pixel data of a luminance signal which correspond in the positional assignment on a picture screen to those of a chrominance signal, one of which is a target pixel data to be interpolated and has a value of 0;
   a filter unit for performing a filtering operation using chrominance pixel data other than the taget pixel data to be interpolated; and
   a filter selector for determining filter coefficients of the filter unit in accordance with the correlation between the pixel data of the luminance signal detected by the correlation detector;
   wherein if the target pixel data to be interpolated and its two adjacent, front and rear, data of the chrominance signal are $C_i$, and $C_{i-1}$, and $C_{i+1}$ respectively, the correlation detector outputs two correaltion values p and 1, and the filter unit outputs a signal $C_i$, expressed as:

$$C_i' = pC_{i-1} + C_{i+q}C_{i+1} \quad (4)$$
$$(p + 1 = 1).$$

4. A chroma signal interpolation filter device according to claim 3, wherein if pixel data of the luminance signal corresponding to Ci, Ci−1, and Ci+1 of the chrominance signal in the positional assignment are Yi, Yi−1, and Yi+1 and a constant is b, the filter unit calculates the correlation values p and 1 as follows:

$$p = \frac{|Y_i - Y_{i+1}| + b}{|Y_{i-1} - Y_i| + b + |Y_i - Y_{i+1}| + b} \quad (5)$$

$$q = \frac{|Y_{i-1} - Y_i| + b}{|Y_{i-1} - Y_i| + b + |Y_i - Y_{i+1}| + b} \quad (6)$$

* * * * *

UNITED STATES PATENT AND TRADEMARK OFFICE
CERTIFICATE OF CORRECTION

PATENT NO. : 5,323,232
DATED : June 21, 1994
INVENTOR(S) : Hideki OTAKA et al.

It is certified that error appears in the above-indentified patent and that said Letters Patent is hereby corrected as shown below:

On the Title Page, between Items [22] and [51] insert:

--[30]  Foreign Application Priority Data

August 1, 1990     [JP] Japan ........... 2-204920
November 13, 1990  [JP] Japan ........... 2-307386--.

Signed and Sealed this

First Day of November, 1994

BRUCE LEHMAN

*Attest:*

*Attesting Officer*     *Commissioner of Patents and Trademarks*